US010862356B2

(12) United States Patent
Bittner et al.

(10) Patent No.: US 10,862,356 B2
(45) Date of Patent: Dec. 8, 2020

(54) ROTOR FOR A RELUCTANCE MACHINE

(71) Applicant: Siemens Aktiengesellschaft, Munich (DE)

(72) Inventors: Roland Bittner, Ansbach (DE); Markus Hösle, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 5 days.

(21) Appl. No.: 16/307,806

(22) PCT Filed: Mar. 31, 2017

(86) PCT No.: PCT/EP2017/057647
§ 371 (c)(1),
(2) Date: Dec. 6, 2018

(87) PCT Pub. No.: WO2017/211477
PCT Pub. Date: Dec. 14, 2017

(65) Prior Publication Data
US 2019/0305616 A1    Oct. 3, 2019

(30) Foreign Application Priority Data

Jun. 7, 2016 (EP) .................................. 16173304

(51) Int. Cl.
*H02K 1/24* (2006.01)
*H02K 15/02* (2006.01)
(Continued)

(52) U.S. Cl.
CPC ............. *H02K 1/246* (2013.01); *H02K 15/02* (2013.01); *H02K 19/103* (2013.01); *H02K 19/20* (2013.01)

(58) Field of Classification Search
CPC ...... H02K 1/246; H02K 19/103; H02K 15/02; H02K 19/20
(Continued)

(56) References Cited

U.S. PATENT DOCUMENTS 9,755,477 B2    9/2017  Bittner et al.
2004/0201301 A1*  10/2004  Regan .................... H02K 1/246
                                                          310/156.53
(Continued)

FOREIGN PATENT DOCUMENTS

CN    103166335 A    6/2013
EP    2768117 A1    8/2014
(Continued)

OTHER PUBLICATIONS

PCT International Search Report and Written Opinion of International Searching Authority dated Jul. 20, 2017 corresponding to PCT International Application No. PCT/EP2017/057647 filed Mar. 31, 2017.

*Primary Examiner* — John K Kim
(74) *Attorney, Agent, or Firm* — Henry M. Feiereisen LLC

(57) ABSTRACT

A rotor for a reluctance machine includes conductor layers and insulation layers arranged in alternation in the axial direction. The conductor layers have magnetic-flux-conducting conductor regions and the insulation layers are electrically insulating. To improve weight and efficiency of a reluctance machine, the rotor is produced at least partially by additive manufacturing.

12 Claims, 4 Drawing Sheets

(51) Int. Cl.
*H02K 19/10* (2006.01)
*H02K 19/20* (2006.01)

(58) Field of Classification Search
USPC .................................................. 310/216.001
See application file for complete search history.

(56) References Cited

U.S. PATENT DOCUMENTS

| | | |
|---|---|---|
| 2013/0147287 A1 | 6/2013 | Kim |
| 2014/0021820 A1* | 1/2014 | Kondou ................ H02K 1/276 |
| | | 310/156.53 |
| 2014/0274723 A1 | 9/2014 | Hösle |
| 2015/0048725 A1 | 2/2015 | Bittner et al. |
| 2015/0244214 A1 | 8/2015 | Kreidler et al. |
| 2016/0056673 A1* | 2/2016 | Buttner ................... H02K 1/28 |
| | | 310/46 |
| 2017/0063183 A1* | 3/2017 | Shrestha ................. H02K 1/22 |
| 2018/0083520 A1* | 3/2018 | Papini ................. H02K 1/2786 |
| 2019/0305616 A1* | 10/2019 | Bittner ................... H02K 15/02 |
| 2020/0204049 A1* | 6/2020 | Zhong ..................... H02K 3/50 |

FOREIGN PATENT DOCUMENTS

| | | |
|---|---|---|
| JP | H09117082 A | 5/1997 |
| RU | 2541513 C2 | 2/2015 |
| SU | 434536 A1 | 6/1974 |
| WO | WO 2013179017 A1 | 12/2013 |
| WO | WO 2014166674 A2 | 10/2014 |

* cited by examiner

ROTOR FOR A RELUCTANCE MACHINE

CROSS-REFERENCES TO RELATED APPLICATIONS

This application is the U.S. National Stage of International Application No. PCT/EP2017/057647, filed Mar. 31, 2017, which designated the United States and has been published as International Publication No, WO 2017/211477 and which claims the priority of European Patent Application, Serial No. 16173304.3, filed Jun. 7, 2016, pursuant to 35 U.S.C. 119(a)-(d).

BACKGROUND OF THE INVENTION

The invention relates to a rotor for a reluctance machine and to a corresponding production method.

In reluctance machines, a stator conventionally generates an alternating magnetic field by means of which a rotor is driven, essentially as a result of the reluctance force. In this context, both the rotor and the stator usually have cores of axially stacked laminations which are insulated from each other by varnish layers on one side. The laminations consist of a material having high magnetic permeability, e.g. electric steel sheet. Each lamination is structured in itself and has a number of cutouts which are used to influence the course of the magnetic field. The cutouts can be considered as non-flux-guiding or non-magnetic-flux-conducting regions, while the laminations represent flux-guiding or magnetic-flux-conducting regions. With regard to production, the respective laminations are stamped. The rotor normally has four or eight terminals. These and other manufacturing limitations are caused inter alia by the requirement to stamp the laminations. The laminated core may be axially welded as a whole. The rotor may also have a squirrel-cage winding in some circumstances.

While the use of stamped laminations allows the rotor to be produced in a proven and relatively economical manner, the machine is consequently very heavy. This is primarily because the rotor must have specific mechanical properties in addition to electromagnetic properties. This means that parts of the rotor may be subjected to significant centrifugal forces depending on rotational speed. Since it is therefore also always necessary to consider the structural integrity of the rotor when using the stamped laminations, the flux-guiding regions and the non-flux-guiding regions must have a minimum size. For better stabilization, it is often also necessary to leave ribs (e.g. running radially) between the flux-guiding regions. However, this results in unwanted stray fluxes which reduce the effectiveness of the machine.

SUMMARY OF THE INVENTION

Against this background, the object of the invention is to improve the weight and the efficiency of a reluctance machine, in particular a synchronous reluctance machine. The object is achieved by a rotor according to claim 1 and by a production method according to claim 8.

The invention proposes a rotor for a reluctance machine, comprising conductor layers and insulation layers arranged in alternation in the axial direction. The conductor layers and insulation layers can alternate, i.e. an insulation layer is arranged between two conductor layers in each case. The individual layers in this context are arranged along the axial direction, this corresponding to the rotational axis of the rotor. The layers are preferably flat and extend perpendicular to the axial direction. It should be noted that as part of alternate arrangement of the conductor and insulation layers, two or more conductor layers may be consecutively disposed without having an insulation layer between them.

The conductor layers have magnetic-flux-conducting conductor regions. Here and in the following, "magnetic-flux-conducting" signifies a high magnetic permeability pr of at least 10 and preferably at least 100. If applicable, the permeability can also be in the order of 103 to 105. In particular, soft magnetic or ferromagnetic magnetic-flux-conducting materials can be used in this context. The conductor layers also have non-magnetic-flux-conducting insulation regions. The insulation regions may be formed at least partially by gaps, which are typically filled with air in operation.

The insulation layers are electrically insulating, i.e. they consist of one or more materials which are categorized as electrical insulators or non-conductors, and therefore have e.g. an electrical conductivity of 10-8 S/m or less. Furthermore, they are preferably non-magnetic-flux-conducting, i.e. they have a uniformly low magnetic permeability. Here and in the following, "non-magnetic-flux-conducting" signifies a low magnetic permeability, e.g. less than 5 or 2. The permeability is often in the region of 1.

According to the invention, the rotor is produced at least partially by additive manufacturing. The term "additive manufacturing" (AM) or also "generative manufacturing" is used in this context as a collective term for manufacturing methods in which a three-dimensional shape is built up successively, either from a shapeless mass such as a liquid or a powder or if applicable from a shape-neutral material such as a strip or a wire. At least to some extent, these manufacturing methods can also be referred to as three-dimensional printing methods. A wide variety of methods can be used in this context, and in combination if necessary. For example, powder bed methods such as Selective Laser Sintering (SLS), Selective Laser Melting (SLM) or Electron Beam Melting (EBM) may be used. However, it is also possible to use solid freeform methods such as Fused Deposition Molding (FDM) or Gas Dynamic Cold Spray (GDCS) or liquid material methods such as Liquid Composite Molding (LCM). The foregoing list of examples is not exhaustive or in any way restrictive.

It is specifically possible to combine different additive manufacturing methods with each other. It is also possible when using a manufacturing method, for example, to employ nozzles etc. of different sizes in order to efficiently produce structures of different sizes.

As a result of using such additive manufacturing methods, it is firstly possible to produce almost any desired three-dimensional shapes, which cannot be produced or can only be produced at disproportionately high expense using conventional deformation, cutting and joining methods. In particular, the size of the structures generated is almost unlimited. Limitations are predefined if necessary by the diameter of a laser beam or an electron beam which is used for melting, or by the diameter of a particle stream that is emitted by a nozzle. It is also possible in this way to join magnetic-flux-conducting and non-magnetic-flux-conducting materials together in almost any desired manner (possibly using an intermediate layer). Since the process-related limitations of the stamping process no longer apply, the weight of the rotor can be significantly reduced. In particular, as described below, structures which were comparatively difficult to create from electric steel sheet in the prior art can be made from insulating materials which are comparatively light. In addition to the weight advantage, which when using a rotor naturally also increases the efficiency of the reluctance machine due to the reduced moment of inertia, the selective use of insulating materials and/or the omission or thinning of specific structures made of conductive material allows stray fluxes to be reduced, which again has a positive effect on the efficiency.

While laminated cores according to the prior art must usually be welded or clamped in order to ensure the required cohesion, this can optionally be omitted in the case of the rotor according to the invention, since its parts can already be connected together by material engagement and/or positive engagement during the course of the additive manufacturing. However, this can also be supplemented to some extent by providing a further connection by welding, clamping or similar.

As a rule, the conductive layers do not consist entirely of magnetic-flux-conducting material. According to the invention, at least one conductor layer has at least one non-magnetic-flux-conducting insulation region, which is arranged at least partially between conductor regions. Such an insulation region can also be electrically insulating. In particular, a conductor layer can have a plurality of insulation regions, each of which is arranged at least partially between conductor regions. The function of the insulation regions is to influence the formation of the magnetic flux within the conductor layers. The insulation regions likewise can be formed at least partially by gaps which are filled with air in the operating state. The conductor layers and insulation layers are preferably arranged to be axially consecutive and the insulation regions and conductor regions within a conductor layer to be radially and/or tangentially consecutive.

At least one insulation region has an in-layer insulating rib which is produced by means of additive manufacturing from non-magnetic-flux-conducting material and which connects two conductor regions.

Such an in-layer insulating rib is preferably also electrically insulating. The designation "in-layer insulating rib" signifies in this context that it extends between two conductor regions within a conductor layer. The in-layer insulating rib is generated by means of an additive manufacturing method, which offers the widest range of possibilities in respect of its dimensions and geometry. It is obviously also possible for a plurality of in-layer insulating ribs to be arranged between and connect two conductor regions. Each insulating rib connects the adjoining conductor regions mechanically and therefore improves the mechanical stability of the rotor. At the same time, such a rib of non-magnetic-flux-conducting material does not cause any unwanted stray fluxes, which do occur when using connecting ribs made of steel sheet as per the prior art. Moreover, many non-magnetic-flux-conducting materials are characterized by a lesser thickness than e.g. electric steel sheet, and therefore the weight and the moment of inertia of the rotor can be reduced in comparison with the prior art. This is further assisted by the fact that, due to the nature of the manufacturing, the rib need not be embodied any thicker than is absolutely necessary for the mechanical stability.

As mentioned above, the widest variety of configuration options are available in respect of geometry. For example, an in-layer insulating rib may run perpendicularly or obliquely relative to the directional course of the adjoining conductor regions. If the adjoining conductor regions run e.g. tangentially, the insulating rib can run radially or also obliquely relative to the radial or to the tangential direction. It is moreover possible for an in-layer insulating rib to have a variable cross section. For example, it may have a larger cross section in the connecting regions to the conductor regions in order to allow better attachment, while having a smaller cross section in an intermediate central section. The insulating rib can also be curved and/or angled. Furthermore, the insulating rib can be cut through or two insulating ribs can intersect each other, e.g. in the shape of an X or V. The extent of an in-layer insulating rib transversely relative to the directional course of the conductor layer may be the same as that of the conductor regions which it connects, but may also be greater or smaller.

Since additive manufacturing allows conductor regions and insulation regions to be joined together in almost any desired geometry, it is possible in particular to dispense with any direct connections between conductor regions. Therefore two conductor regions are advantageously separated completely by an insulation region which is situated between them. This can apply in particular to the plurality of conductor regions or even to all conductor regions. Two such conductor regions are mechanically connected together by non-magnetic-flux-conducting material in each case, e.g. in the form of one or more in-layer insulating ribs.

While in the case of a rotor according to the prior art, which is built up of axially stacked laminations with varnish layers arranged between them, both the laminations and the varnish layers are usually each so embodied as to be of equal thickness, the layer thicknesses in the rotor according to the invention can be varied almost without restriction. Therefore the rotor can have conductor layers and/or insulation layers with at least sectionally differing axial spread. This means that at least two conductor layers can have at least sectionally differing axial spread, i.e. a different thickness. This includes the possibility that the axial spread of at least one conductor layer varies sectionally. Correspondingly, at least two insulation layers can have at least sectionally differing axial spread. Such a variation in the layer thickness may be chosen for mechanical reasons, for example, or in order to influence the formation of the magnetic flux.

According to an embodiment, an insulation layer has at least one intermediate insulating rib made of electrically insulating material and produced by additive manufacturing, which connects two conductor layers. Such an intermediate insulating rib extends between two conductor layers, i.e. in the axial direction. In this context, it is entirely possible for a spread of the cited insulating rib in the directional course of the conductor layers to be greater than its spread transversely relative to the directional course of the conductor layers (i.e. for the rib to be thicker than it is long). The function of such an intermediate insulating rib consists in the mechanical connection of the cited two conductor layers, wherein a prescribed separation of the two conductor layers must also be respected. At the same time, the conductor layers must be electrically insulated from each other, at least in the region of the air gap of the reluctance machine, in order to reduce eddy currents. Such an intermediate insulating rib is preferably also non-magnetic-flux-conducting. While a similar function is normally carried out in the prior art by varnish layers that are present between the laminations, extending over the whole surface of the lamination, one or more intermediate insulating ribs can be produced in a material-saving manner by means of the additive manufacturing in such a way that this is sufficient for the mechanical connection of the adjoining conductor layers, but at the same time the weight and hence the moment of inertia of the rotor is kept as low as possible.

An intermediate insulating rib can optionally extend from one conductor layer at least to the next conductor layer but one. Usually though not necessarily, such an insulating rib is also connected to the intermediate i.e. adjacent conductor layer. It is possible in this context for three or more conductor layers, optionally even all conductor layers of the rotor, to be connected together by such an insulating rib. Of course, a plurality of insulating ribs of this continuous design may be present. Here likewise, few limitations exist due to the high flexibility of the additive manufacturing methods.

The insulation of the conductor regions from each other, like the insulation of the conductor layers from each other, can in principle be effected exclusively by means of additively manufactured intermediate insulating ribs or in-layer insulating ribs (and by air). It is however also possible additionally or alternatively to deposit an insulating varnish in liquid form which then hardens. Such an insulating varnish may be deposited e.g. between two additive manufacturing steps or upon completion of the overall additive manufacturing.

The geometry of the intermediate insulating ribs can also be varied considerably. For example, an intermediate insulating rib can run perpendicularly or obliquely relative to the directional course of the conductor layers. An intermediate insulating rib can also have a variable cross section. For example, it may have a larger cross section in the connecting regions to the conductor layers, in order to allow better attachment, while having a smaller cross section in an intermediate central section. The insulating rib can also be curved and/or angled. Furthermore, the insulating rib can be cut through or two insulating ribs can intersect each other, e.g. in the shape of an X or V. The mechanical oscillatory characteristics of the rotor can be influenced inter alia by the geometry of the intermediate insulating ribs and in-layer insulating ribs, such that unwanted noise development can be prevented if applicable.

Although different terms are used here for intermediate insulating ribs and in-layer insulating ribs, it is possible for an intermediate insulating rib and an in-layer insulating rib to merge into each other or for an insulating rib to be considered as both an intermediate insulating and an in-layer insulating rib.

The rotor can comprise at least two different magnetic-flux-conducting materials. In particular, this means that the different materials are physically separate, i.e. not mixed together. The cited materials can be combined within a conductor layer and even within a conductor region if applicable. This option, which is practically excluded when manufacturing from steel sheets, can readily be realized when using additive manufacturing by depositing the different materials successively, e.g. layer-by-layer or strip-by-strip. It is moreover also possible to employ different materials in different conductor layers. The different materials may differ in respect of e.g. their permeability whereby the formation of the magnetic flux can be influenced, or in respect of their thickness or stiffness whereby the mechanical properties can be influenced. Both the choice of material and the axial thickness of a conductor layer or insulation layer may also depend on whether significant eddy currents occur at the respective location. If this is not the case, it is possible to use e.g. a cheaper material in combination with a greater axial layer thickness.

It is possible to use not only solid magnetic-flux-conducting materials, but also ferrohydrodynamic fluids, for example. According to an embodiment, the at least one conductor layer has at least one hollow space containing a ferrohydrodynamic fluid. In this type of configuration, the hollow space may be a plurality of pores in which the ferrohydrodynamic fluid is contained. As part of the production process, the wall of the hollow space can also be produced in an additive manufacturing method, the ferrohydrodynamic fluid being introduced into the hollow space before this is sealed. The material surrounding the ferrohydrodynamic fluid can itself be a ferromagnetic material, for example. It is possible to use such a ferrohydrodynamic fluid in one conductor region while using a solid conductive material in another conductor region of the same conductor layer. Alternatively, all conductor regions can contain a ferrohydrodynamic fluid in a whole conductor layer.

According to an embodiment, at least one conductor layer comprises a magnetically anisotropic material. Such a material has a preferred direction for the magnetization, which can be used to adjust the magnetic resistance in specific parts of the rotor as a function of the direction. To this end, for example, a magnetically anisotropic material can be to some extent aligned during deposition as part of the additive manufacturing process, by means of a magnetic field which can be developed in the proximity of a nozzle or similar device, such that this alignment is preserved after the manufacturing process is complete.

The widest variety of possibilities exists in relation to the non-magnetic-flux-conducting or electrically insulating materials likewise. The rotor can therefore comprise at least two different non-magnetic-flux-conducting materials and/or two different electrically insulating materials. The choice of the respective material may depend on the required mechanical stability in the respective region, for example. With regard to centrifugal forces at high rotational speeds, it might be necessary to employ a more stable material in a radially outer region, while a less stable material can be used in an inner region in order to reduce weight. A specific material can also be chosen regionally, said material providing an optimum transfer of heat to the air gap of the reluctance machine, the end faces of the rotor and/or the shaft. Undesired oscillation within the rotor can also be suppressed by the choice of material.

The surface of the rotor can be adapted to generate as far as possible no audible airborne sound, particularly if high rotational speeds are anticipated. This can be achieved either by means of a surface design which is as smooth as possible or by profiling the surface in a suitable manner. To the extent that it is necessary to arrange insulating ribs in a radially outlying region for this purpose, adequate stability can be ensured by means of their thickness or their material if applicable.

The shaft of the rotor can be manufactured separately from the magnetic-flux-conducting element thereof, various manufacturing methods being employed. It can be produced by means of extrusion, for example, a hollow profile of the shaft being generated. The shaft may consist at least partially of foamed metal, whereby its weight and moment of inertia can likewise be reduced. A shaft of the rotor is preferably produced by additive manufacturing. In this context, during the course of the additive manufacturing, it can be created before, at the same time, or after the conductor layers and insulation layers of the rotor, such that these are built up directly on the shaft or vice versa and material engagement is thereby produced. During the course of such an additive manufacturing method, it is naturally possible to generate the widest variety of types of hollow spaces, which are separated from each other by ribs or chamber walls.

A rotor according to the invention can also have a squirrel-cage winding or squirrel-cage damper winding. This allows both asynchronous starting and mechanical damping of any oscillations of the rotor. Parts of the cage can be pre-prepared and pre-positioned for the additive manufacturing process, such that the additive manufacturing takes place "around them" so to speak. Alternatively, the cage itself can be produced by additive manufacturing with the other parts of the rotor. Finally, it is possible to provide the cage in the rotor subsequently.

In order to allow efficient heat removal, the rotor can have at least one ventilation opening. Attached to such a ventilation opening is a ventilation channel which leads from the surface into the interior of the rotor. While it is generally difficult to provide such ventilation channels when building up a core in accordance with the prior art, and the course of said channels in particular is strictly limited, almost any desired geometry of a ventilation channel and of a ventilation opening can be realized when using additive manufacturing. The ventilation channel can run sectionally through conductor regions and/or insulation regions.

The invention further proposes a production method for a rotor of a reluctance machine. The rotor comprises conductor layers and insulation layers arranged in alternation in the axial direction, wherein the conductor layers comprise magnetic-flux-conducting conductor regions and the insulation layers are electrically insulating. According to the invention, the rotor is produced at least partially by additive manufacturing. The cited terms are explained above with reference to the rotor according to the invention. Advantageous embodiments of the inventive method correspond to the embodiments of the inventive rotor cited above.

The process of building up the rotor and those parts thereof which are produced by additive manufacturing can take place in the widest variety of ways. For example, the individual layers extending in a radial and tangential direction can be built up consecutively. This means that one level is completed first and the building up then progresses in the axial direction with the next successive level there. As part of this activity, the building up of an individual level can take place from the inside radially outwards or e.g. by creating the level line-by-line according to a Cartesian system of coordinates. Alternatively, the process could also take place from the inside radially outwards, for example, wherein the radially inner part is built up first along the entire axial spread of the rotor. The next layer radially outwards would then be built up, etc. The manufacturing sequence is therefore essentially independent of the layout of the conductor layers and insulation layers.

BRIEF DESCRIPTION OF THE DRAWING

Further details and advantages of the invention can be derived from the following detailed description of the possible embodiment variants of the invention with reference to the appended figures, in which.

DETAILED DESCRIPTION OF PREFERRED EMBODIMENTS

Figure 1:
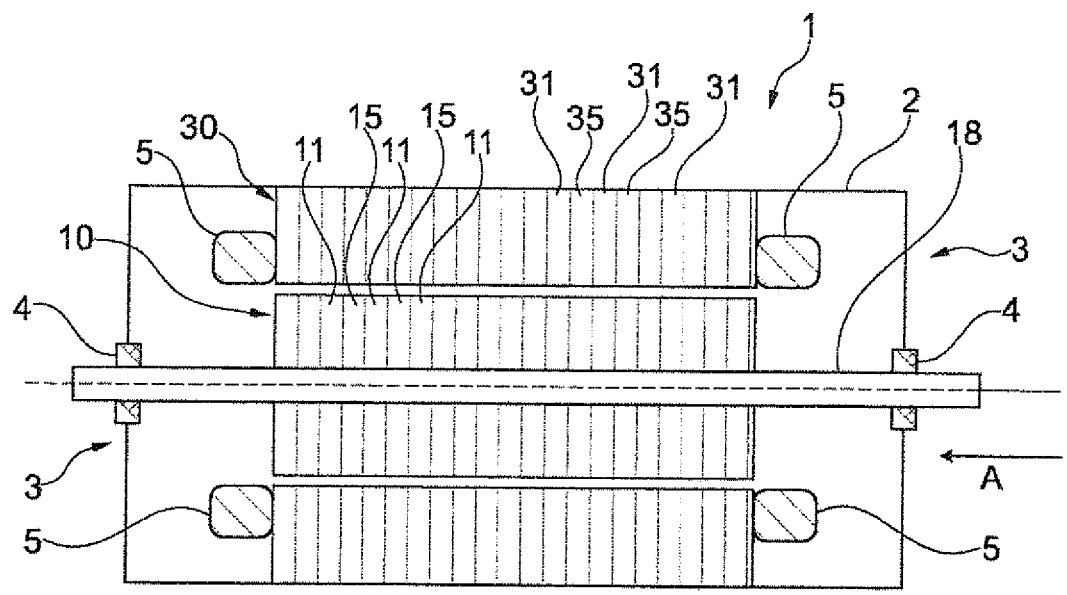
FIG. 1 shows a schematic sectional view of a reluctance machine with a rotor according to a first embodiment variant of the invention.

FIG. 1 shows a schematic sectional view of a reluctance machine 1. This has a housing 2 with end shields 3 at which a shaft 18 of a rotor 10 is rotatably mounted via a bearing 4. The rotor 10 can therefore rotate about an axis of rotation which runs in the axial direction A. The rotor 10 is surrounded radially by a stator 30 which is stationary in relation to the housing 2. End windings 5 illustrated here in a highly schematized manner are arranged on both sides of the stator 30 and are connected to a current source via connections (not shown). As indicated by the figure, both the rotor 10 and the stator 30 comprise a row of conductor layers 11, 31, arranged consecutively in the axial direction A, which are at least partially magnetic-flux-conducting and between which are arranged electrically non-conductive insulation layers 15, 35. According to the invention, the rotor 10 is produced by additive manufacturing. The stator 30 can be produced in a conventional manner, i.e. wherein the conductor layers 31 are made from electric steel sheet and the insulation layers 35 are insulating varnish layers. It is optionally possible for the stator 30 likewise to be produced by additive manufacturing.

Figure 2:
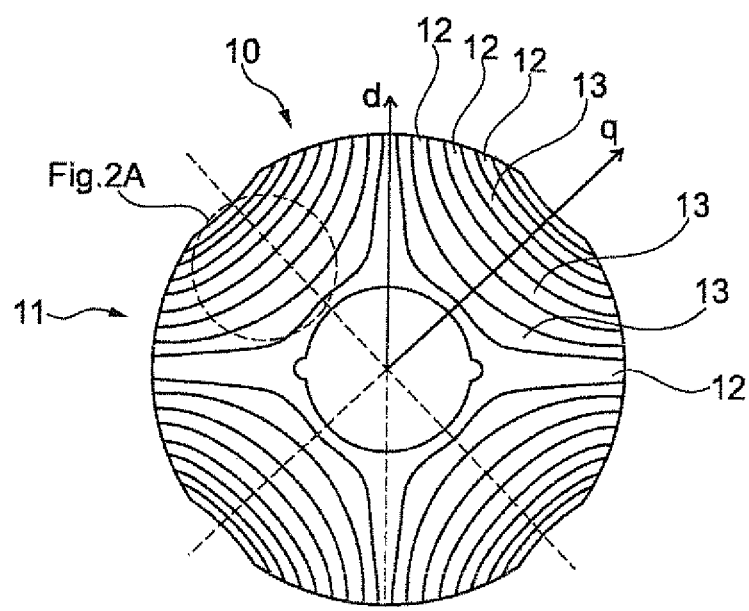
FIG. 2 shows a sectional view of a rotor of the reluctance machine from FIG. 1.

FIG. 2 shows a sectional view of the rotor 10 of the reluctance machine 1 from FIG. 1, the shaft 18 being omitted for reasons of clarity. The section here runs through a conductor layer 11 which comprises both magnetic-flux-conducting conductor regions 12 and non-magnetic-flux-conducting insulation regions 13 arranged between them. It can be seen from the figure that the conductor regions 12 do not touch each other, but are completely separated from each other by the insulation regions 13. This is essentially possible because during the course of an additive manufacturing method the individual regions 12, 13 can be built up successively, making it unnecessary to provide flux-conducting ribs between adjacent conductor regions 12. In-layer insulating ribs 14a-14f of non-magnetic-flux-conducting material can be provided there instead, as shown by way of example in the magnified illustration in FIG. 2A. Also marked in the figure are the d-axis which indicates the general magnetic preferred direction, and the q-axis that runs at an angle of 45° relative thereto.

Figure 2A:
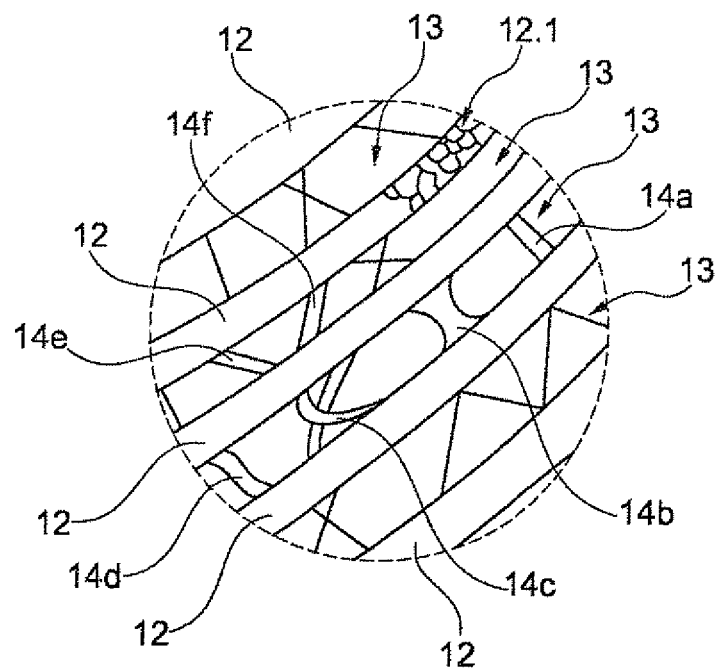
FIG. 2A shows a magnified detail view of FIG. 2.

FIG. 2A shows a magnified detail view of FIG. 2. It is possible here to identify different in-layer insulating ribs 14a-14f which run within the conductor layer 11 in each case and connect two adjacent conductor regions 12 to each other. The widely differing embodiments of the in-layer insulating ribs 14a-14f are intended solely as examples and are used to illustrate various options. So many different shapes of insulating ribs would not normally be combined within a rotor 10. It is possible to identify e.g. a simple insulating rib 14a, which runs transversely relative to the directional course of the adjoining conductor regions 12 and has a constant cross section. Next to this is shown a further insulating rib 14b, which has a variable cross section and widens towards the adjoining conductor regions 12. Also shown is an X-shaped insulating rib 14c and an S-shaped curved insulating rib 14d. It is also possible to identify largely straight insulating ribs 14e, 14f which are however aligned obliquely relative to the directional course of the conductor regions 12. A series of gaps 12.1 are shown in one of the conductor regions 12, and these are filled with a ferrohydrodynamic fluid. During the course of a manufacturing process, the gaps 12.1 can first be built up until the ferrohydrodynamic fluid can be introduced, after which they are completely sealed.

Figure 3:
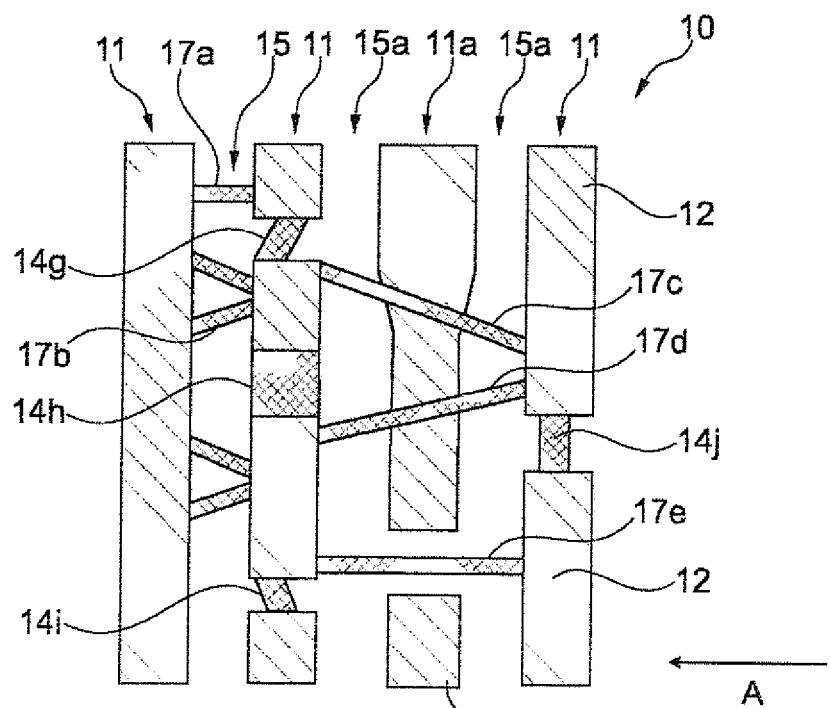
FIG. 3 shows further longitudinal sectional view of the rotor from FIG. 2.

FIG. 3 shows a longitudinal sectional view of one part of the rotor 10 from FIG. 2, the sectional plane corresponding to that in FIG. 1 and therefore running radially and axially. It is again possible to identify four conductor layers 11, 11a and insulation layers 15, 15a arranged between them. Very different structures are again shown here for purely illustrative purposes as in FIG. 2A. It is possible to identify both a plurality of in-layer insulating ribs 14g-14j and a plurality of intermediate insulating ribs 17a-17e which connect the various conductor layers 11, 11a together. While one in-layer insulating rib 14h has the same spread transversely relative to the orientation of the conductor layers 11, 11a as the adjoining conductor regions 12 which it connects, three other insulating ribs 14g, 14i, 14j have a lesser spread. Two of these insulating ribs 14g, 14i also run obliquely relative to the orientation of the conductor layer 11.

The intermediate insulating ribs 17a-17e include both those insulating ribs 17a, 17b which only extend from one conductor layer 11 to the next conductor layer 11 in each case, and those insulating ribs 17c-17e which extend further to the next conductor layer 11 but one. Some insulating ribs 17a, 17e run parallel to the axial direction A while other insulating ribs 17b, 17c, 17d run obliquely relative to the axial direction A. Two of the insulating ribs 17c, 17d which continue to the next conductor layer 11 but one are also connected to the intermediate conductor layer 11, while a further insulating rib 17e passes through a gap in the intermediate conductor layer 11 and is not connected thereto.

A conductor layer 11a has an enlarged spread sectionally in the axial direction, as a result of which two adjoining insulation layers 15a have a narrower axial spread sectionally than the third insulation layer 15 shown. This is intended merely as an example, and it would also be possible e.g. for the whole of the conductor layer 11a to have a larger or smaller axial spread than the other conductor layers 11.

It is obvious that although the complex structures shown here can be created using an additive manufacturing method, they would be difficult or impossible to realize using conventional methods, e.g. stratification of electric steel sheets. During the production of the structures shown in FIG. 2A and FIG. 3, it is possible e.g. to use at least two different devices (e.g. nozzles or similar), the conductor regions 12 being deposited by one device and the different insulating ribs 14a-14i, 17a-17e by the other device. One possibility here is for the individual conductor layers 11, 11a and insulation layers 15, 15a to be built up progressively, the magnetic-flux-conducting material of the conductor regions 12 and (where necessary) the non-magnetic-flux-conducting material of the insulating ribs 14a-14i, 17a-17e being deposited alternately in each case.

Figure 4:
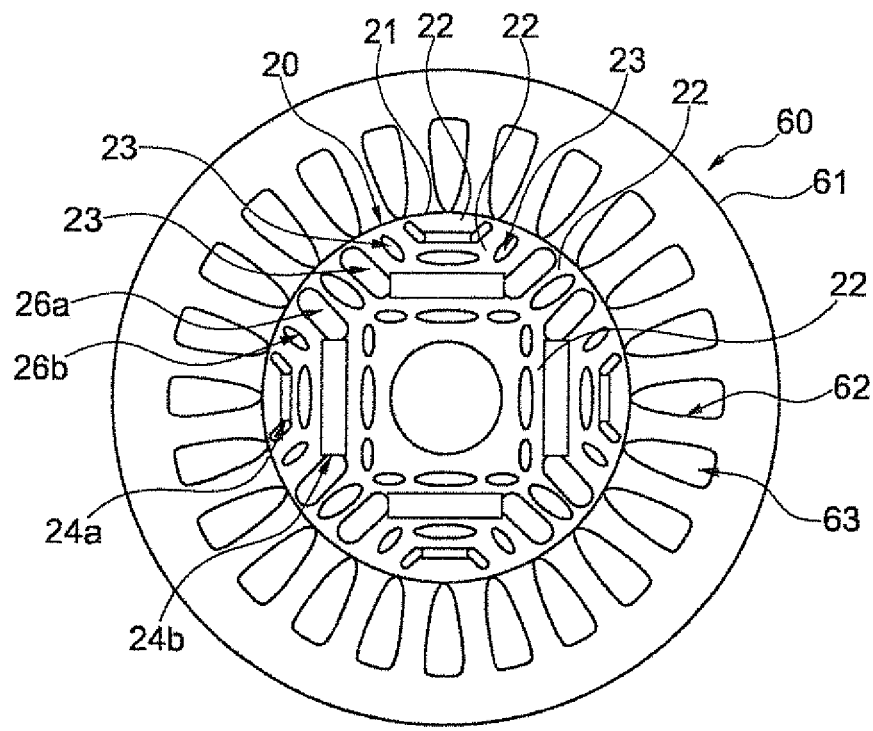
FIG. 4 shows a sectional view of a rotor and a stator according to a second embodiment variant.

FIG. 4 shows an illustration of a second embodiment variant of a rotor 20 and a stator 60. Shown again in this context is a transverse section relative to the axial direction A, including a conductor layer 61 of the stator 60 and a conductor layer 21 of the rotor 20. The conductor layer 61 of the stator has a plurality of gaps 63 which are arranged in a continuous circle with ribs 62 between them. The ribs 62 are made of magnetic-flux-conducting material here. The conductor layer 61 can be made of stamped steel sheet if applicable or it can be produced in an additive manufacturing method, whereby finer structures can be realized if applicable. The conductor layer 21 of the rotor 20 comprises various conductor regions 22 and insulation regions 23 which are arranged between them. In-layer insulating ribs 24a, 24b are arranged in some insulation regions 23, having been built up from a non-magnetic-flux-conducting material during the course of the additive manufacturing. It is also possible to identify a number of thin conductor ribs 26a, 26b, which can be so embodied as to be particularly thin using the additive manufacturing method.

Figure 5:
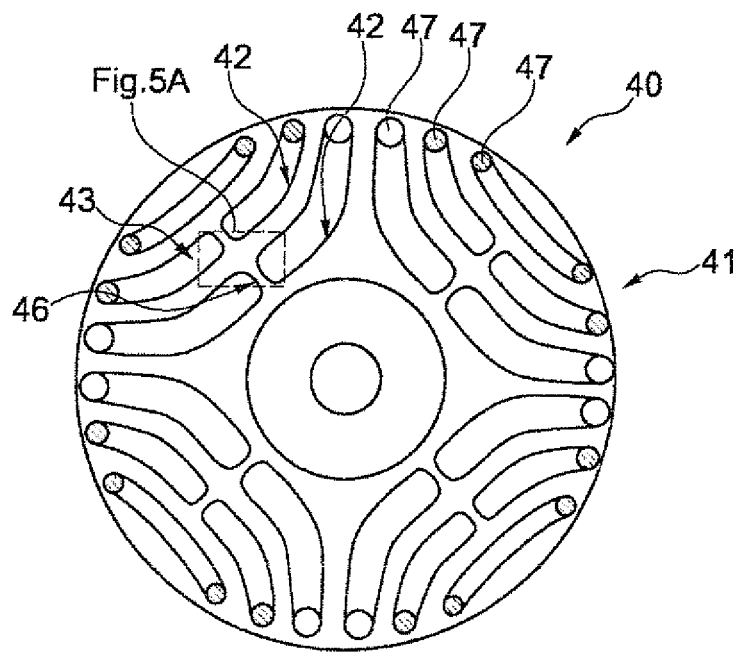
FIG. 5 shows a sectional view of a rotor according to a third embodiment variant.
Figure 5A:
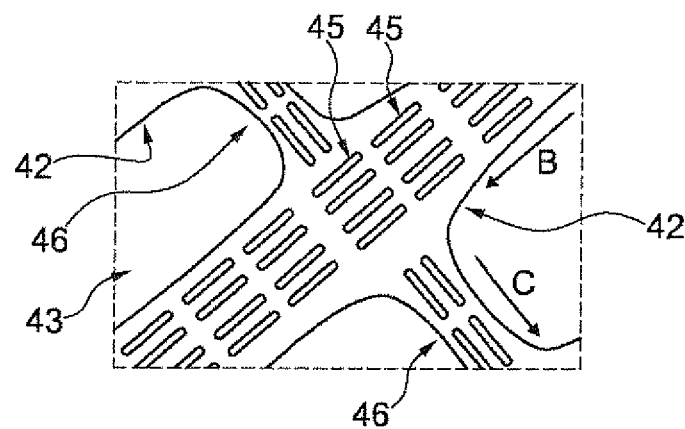
FIG. 5A shows a magnified detail view of FIG. 5.

FIG. 5 shows a third embodiment variant of a rotor 40, only one conductor layer 41 being illustrated again. It is possible here likewise to identify conductor regions 42 and insulation regions 43 arranged between them. The insulation regions 43 may be completely filled with air or in-layer insulating ribs may be sectionally present, though this is not shown here. Furthermore, the conductor regions 42 are partially connected by conductor ribs 46 which extend transversely relative to the directional course of the respective conductor regions 42. The conductor regions 42 and the conductor ribs 46 were produced from two different magnetic-flux-conducting materials in an additive manufacturing method. As shown in FIG. 5A, which represents a magnified detail view of FIG. 5, both the conductor regions 42 and the conductor ribs consist predominantly of a first magnetic-flux-conducting material, in which strips 45 of a second magnetic-flux-conducting material are however embedded. The strips 45 are elongated, their directional course B in the conductor regions 42 running at an angle of 90° relative to their directional course C in the conductor ribs 46. Alternatively, the strips 45 may also be gaps which are filled with air. In both cases, the presence of the strips makes it possible to influence the magnetic flux within both the conductor regions 42 and the conductor ribs 46 to some extent by means of a "fine structure". Alternatively or additionally, it is also conceivable to use at least one magnetically anisotropic material whose preferred direction within the conductor regions and within the conductor ribs is configured differently.

Furthermore, bars 47 of a squirrel-cage winding are arranged in a radially outlying part of the insulation regions 43. These can either be built up likewise from a suitable material during the course of the additive manufacturing or they can be positioned in advance while the rotor 40 is built up around them by means of additive manufacturing. The bars 47 are however optional and can also be omitted in the rotor 40 shown.

Figure 6:
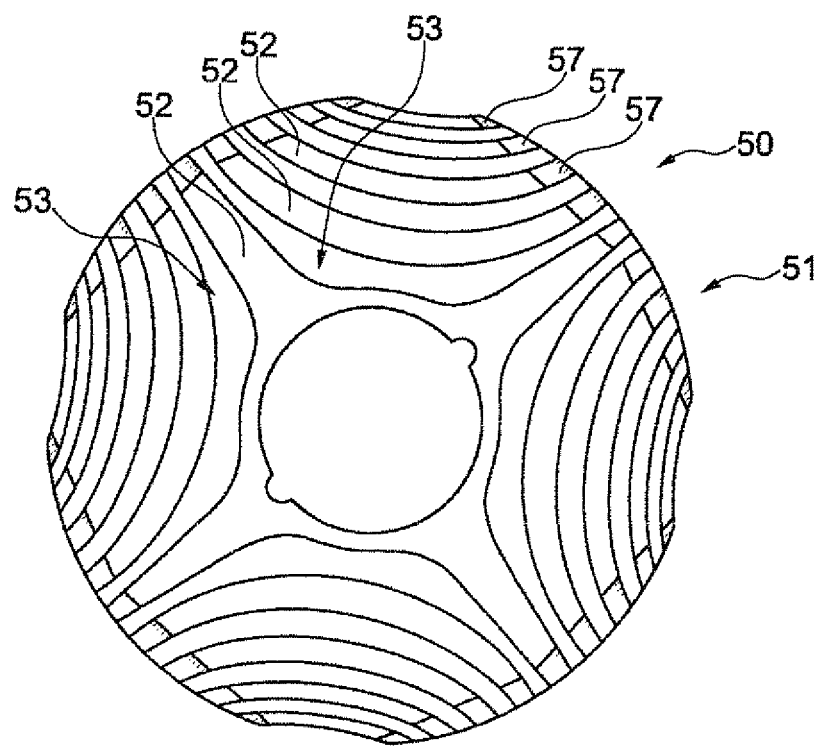
FIG. 6 shows a sectional view of a rotor according to a fourth embodiment variant.

FIG. 6 shows a fourth embodiment variant of a rotor 50, a conductor layer 51 being illustrated here likewise. This is a variant of the embodiment from FIG. 2, having conductor regions 52 and insulation regions 53 of essentially corresponding design. However, bars 57 of a squirrel-cage winding are attached to the conductor regions 52 at a radially outer side, and are adapted to the shape of the conductor regions 52 in respect of their cross section. In this case, it is obviously advantageous to build up the bars 57 concurrently with the conductor regions 52 and the insulation regions 53 by means of additive manufacturing.

The invention claimed is:
1. A rotor for a reluctance machine, said rotor comprising:
conductor layers having magnetic-flux-conducting conductor regions, at least one of the conductor layers having at least one non-magnetic-flux-conducting insulation region which is arranged at least partially between respective ones of the conductor regions, wherein at least one insulation region has an in-layer insulating rib which is made from non-magnetic-flux-conducting material through additive manufacturing and which connects two of the conductor regions; and
insulation layers configured to be electrically insulating, with the conductor layers and the insulation layers being arranged alternatingly in an axial direction, wherein the rotor is produced at least partially through additive manufacturing,
wherein at least one of the conductor layers has at least one hollow space containing a ferrohydrodynamic fluid.

2. The rotor of claim 1, wherein at least two of the conductor regions are completely separated by a said insulation region situated between the at least two of the magnetic-flux-conductor regions.

3. The rotor of claim 1, wherein the conductor layers and/or the insulation layers have an axial spread which differs at least sectionally.

4. The rotor of claim 1, wherein at least one of the insulation layers includes an intermediate insulating rib which is made from electrically insulating material through additive manufacturing and connects two of the conductor layers.

5. The rotor of claim 4, wherein the intermediate insulating rib extends from one of the two conductor layers at least to another of the conductor layers, representing the other one of the two conductor layers.

6. The rotor of claim 1, further comprising at least two different magnetic-flux-conducting materials.

7. The rotor of claim 1, wherein at least one of the conductor layers comprises a magnetically anisotropic material.

8. The rotor of claim 5, wherein the intermediate insulating rib has a variable cross section.

9. A method for the production of a rotor for a reluctance machine, comprising:
providing at least one of a plurality of conductor layers with at least one non-magnetic-flux-conducting insulation region between magnetic-flux-conducting conductor regions thereof;
arranging the conductor layers and a plurality of electrically insulating insulation layers in alternating relationship in an axial direction;
connecting two of the magnetic-flux-conducting conductor regions by an in-layer insulating rib which is made from non-magnetic-flux-conducting material through additive manufacturing; and
producing the rotor at least partially through additive manufacturing,
wherein the additive manufacturing consists of powder bed methods and/or solid freeform methods.

10. The method of claim 9, further comprising:
manufacturing the rotor by building up layer by layer in the axial direction; and
forming the conductor layers and the insulation layers in perpendicular relation to a rotor axis, with layers having flux-guiding regions alternating with layers having flux-inhibiting regions.

11. The method of claim 9, further comprising:
manufacturing the rotor by building it up radially; and
forming flux guides and flux inhibitors in parallel relation to a rotor axis, with layers having flux-guiding regions alternating with layers having flux-inhibiting regions.

12. The method of claim 9, further comprising producing a shaft of the rotor at least partially through additive manufacturing.

* * * * *